United States Patent [19]

Holmes et al.

[11] 3,823,901

[45] July 16, 1974

[54] AERIAL LAUNCH SYSTEM

[75] Inventors: Karl A. Holmes; James R. Knepshield; Dale E. Knutsen, all of Ridgecrest, Calif.

[73] Assignee: The United States of America as represented by the Secretary of the Navy, Washington, D.C.

[22] Filed: July 24, 1973

[21] Appl. No.: 382,238

[52] U.S. Cl............................................ 244/118 R
[51] Int. Cl............................................... B64d 7/00
[58] Field of Search......... 244/118 R, 137 R, 129 D, 244/136; 9/14; 14/71, 72

[56] References Cited
UNITED STATES PATENTS

| | | | |
|---|---|---|---|
| 2,441,367 | 5/1948 | Noville | 244/137 R |
| 2,621,565 | 12/1952 | Laddon et al. | 244/137 R |
| 2,738,939 | 3/1956 | Johnson | 9/14 |
| 3,088,608 | 5/1963 | Theodore | 244/137 R |
| 3,540,677 | 11/1970 | Johnson et al. | 244/137 R |
| 3,552,587 | 1/1971 | Warren | 244/137 R |

Primary Examiner—Trygve M. Blix
Assistant Examiner—Galen L. Barefoot
Attorney, Agent, or Firm—R. S. Sciascia; Roy Miller; Gerald F. Baker

[57] ABSTRACT

A launcher support structure is provided for a helicopter installation which may be quickly and easily installed or removed. The primary structural members extend across the floor of the helicopter and out a doorway. These members are attached to the helicopter structure at the door sill using existing hardware. A compression strut between the launcher structural members and overhead helicopter structure is utilized in the helicopter cabin and tension rods are extended from the extreme outboard ends of the structure to the fore and aft helicopter tie-down rings.

4 Claims, 1 Drawing Figure

PATENTED JUL 16 1974 3,823,901
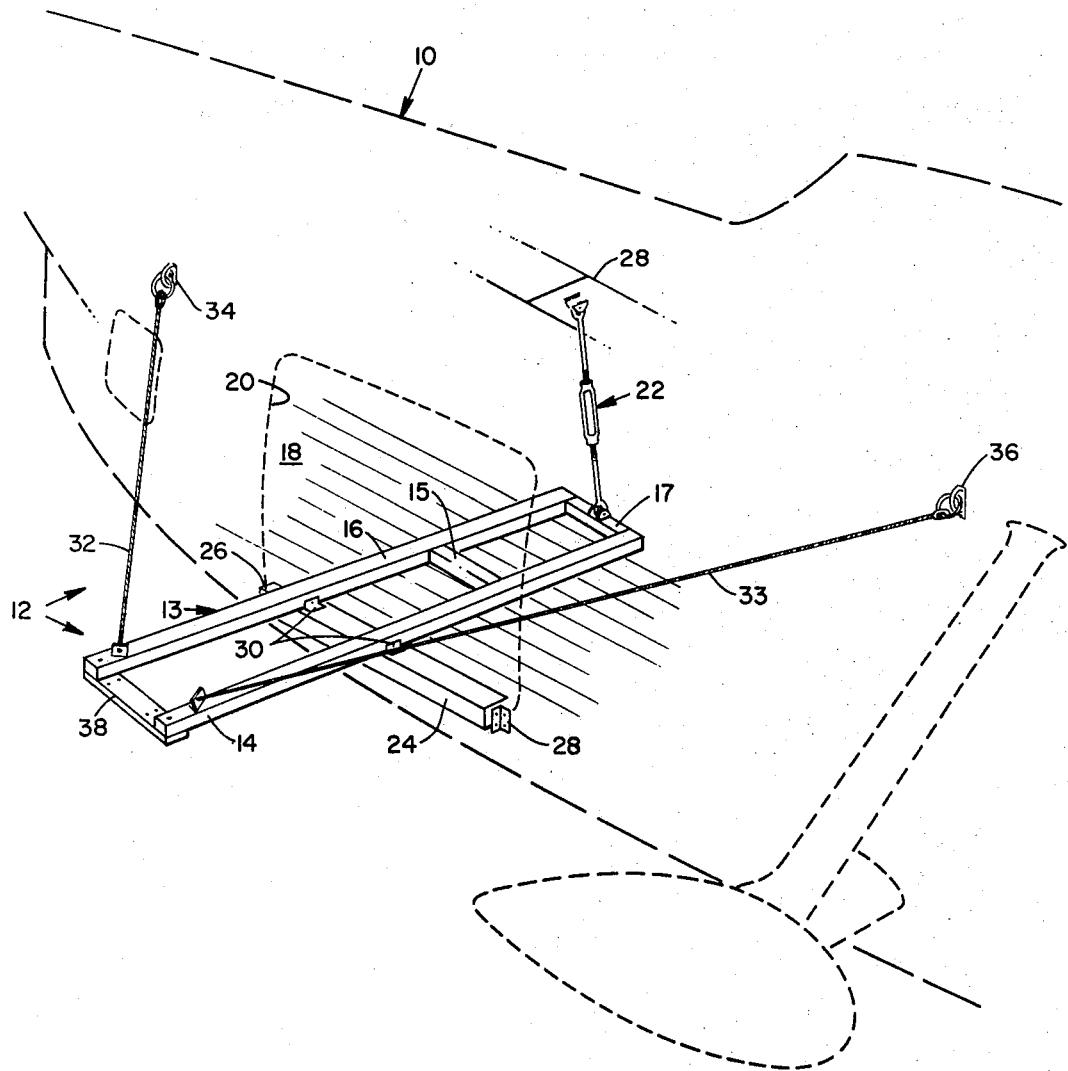

AERIAL LAUNCH SYSTEM

BACKGROUND OF THE INVENTION

The present invention relates to an aerial launch station and particularly a launch station which may be quickly and easily attached or removed from a helicopter.

In situations where a helicopter may be called upon to deliver a stores package by aerial launch, the helicopter may or may not be equipped with a rack for that purpose. Where the launching is unusual, it is not practical to fasten a permanent rack on the helicopter. It is an object of this invention, therefore, to provide means for temporarily fastening a launcher station to a helicopter.

BRIEF DESCRIPTION OF THE DRAWING

The single FIGURE of the drawing is a perspective view of a launcher station according to the invention with helicopter outlines in phantom.

DESCRIPTION OF THE INVENTION

The single FIGURE of the drawing shows an outline 10 of a typical helicopter usuable with the present invention. The launch station 12 according to the invention comprises a hanger frame 13 consisting, for example, of two box beams 14, 16 and cross members 15, 17.

Hanger frame 13 is positioned across the helicopter floor 18 and protrudes outboard through door opening 20.

An adjustable compression strut 22 is attached to the inboard cross member 17 and to the helicopter interior ceiling structure at 28. A door sill member 24 is fastened to fit between existing fixtures 26 and 28 and this sill member 24 is fastened to the hanger frame 13 by means of angle pieces 30.

The outboard ends of beams 14 and 16 are fastened to the helicopter by tension rod members 32, 33 which are hung from existing helicopter tie down rings 34, 36. The outboard ends of the beams 14, 16 are also spanned by a cross member 38 to complete the structure and to provide means for hanging a launcher rack, for example.

This system gives helicopters the capability of air launching experimental missiles, jet target aircraft and the like. The system provides great flexibility and extends the use of the helicopter in experimental work. The system described may be attached to an RH–3A helicopter without removing or adding hardware to the helicopter except as shown. A launch station fabricated according to the present invention was attached to an RD–3A helicopter at Naval Missile Center, Point Mugu, and a small turbojet-powered target drone (MQM–74A) was attached to the launch station and the drone was launched from the helicopter at an elevation of 3,000 feet. Separation of the drone from the helicopter was clean and positive with only a moderate roll oscillation. Postflight inspection of all test components revealed no adverse conditions and the launch was considered a success.

What is claimed is:

1. Detachable launch station for an aircraft having a cargo compartment with floor and ceiling members and a side opening:
    said launch station comprising:
        hangar beam means lying athwart said cargo compartment contiguous to said floor and extending outboard through said opening;
        compression strut means fastened between the inboard end of said hangar beam means and said ceiling members;
        said hangar beam means being fastened to an aircraft structural member at said opening;
        said hangar beam means further having support means on the outboard end thereof to provide attachment for a stores release rack or the like; and
        means tieing said outboard end fore and aft to said aircraft.

2. The launch station of claim 1 wherein said aircraft is a helicopter having fore and aft tie down rings and said tieing means for the outboard end of said hangar beam means are fastened to said tie down rings.

3. The launch station of claim 1 wherein a reinforcing sill means is fastened across the bottom of said opening and the hangar beam means is fastened to said sill means.

4. A launch station for a helicopter having a central cargo compartment with floor and ceiling members and a side door opening;
    said launch station comprising:
        rectangular hanger means comprising two box beams integrally fastened together in spaced apart relationship by two spaced cross members;
        one of said cross members forming an inboard end piece;
        adjustable compression strut means fastened to said end piece and to the ceiling of said cargo compartment;
        a door sill member fastened across the lower ledge of said door opening and fastened to each of said beams;
        tension rods fastened to the outboard ends of said beams and fastened respectively to fore and aft helicopter tie down rings; and
        a supporting cross member fastened across the outboard ends of said beams to provide an attachment for a stores release rack or the like.

* * * * *